United States Patent

Salcicccioli et al.

[11] Patent Number: 5,887,875
[45] Date of Patent: Mar. 30, 1999

[54] UNITARY AXLE SEAL FOR A MOTOR VEHICLE

[75] Inventors: Dennis Salcicccioli, Troy; Harold Leon Chambers, Sterling Heights, both of Mich.

[73] Assignee: Ford Global Technologies, Inc., Dearborn, Mich.

[21] Appl. No.: 316,957

[22] Filed: Oct. 3, 1994

[51] Int. Cl.$^6$ .................................................. F16T 15/34
[52] U.S. Cl. ........................ 277/402; 277/549; 277/562
[58] Field of Search .................................. 277/35, 37, 38, 277/53, 57, 95, 152, 153, 402, 549, 562

[56] References Cited

U.S. PATENT DOCUMENTS

| | | |
|---|---|---|
| 2,752,178 | 6/1956 | Hoffman . |
| 4,325,557 | 4/1982 | Kawamoto ............................ 277/153 |
| 4,448,426 | 5/1984 | Jackowski et al. ..................... 277/37 |
| 4,497,495 | 2/1985 | Christiansen . |
| 4,699,526 | 10/1987 | Sato ....................................... 277/153 |
| 4,722,540 | 2/1988 | Kozyra et al. . |
| 5,004,248 | 4/1991 | Messenger ............................ 277/37 |
| 5,149,207 | 9/1992 | Vignoito ................................ 277/152 |
| 5,201,528 | 4/1993 | Upper .................................... 277/153 |
| 5,201,529 | 4/1993 | Heinzen ................................ 277/153 |
| 5,207,436 | 5/1993 | Lederman . |
| 5,292,199 | 3/1994 | Hosbach et al. . |
| 5,398,942 | 3/1995 | Duckwall et al. ..................... 277/153 |

*Primary Examiner*—Daniel G. DePumpo
*Attorney, Agent, or Firm*—Gregory P. Brown

[57] ABSTRACT

A unitary axle seal (52) for use in an axle assembly of a motor vehicle to reduce the flow of contaminants from an exterior source (92) to an interior region (93) of the axle assembly is disclosed. The unitary axle seal (52) may be used in combination with unitized bearing seals (46) to reduce the exposure of contaminants to a bearing pack (44) contained within the axle assembly. The unitary axle seal combines a complex labyrinth (96) with an elastomeric seal (74) forming frictional sealing contacts (80,84,88) with the axle (10).

8 Claims, 1 Drawing Sheet

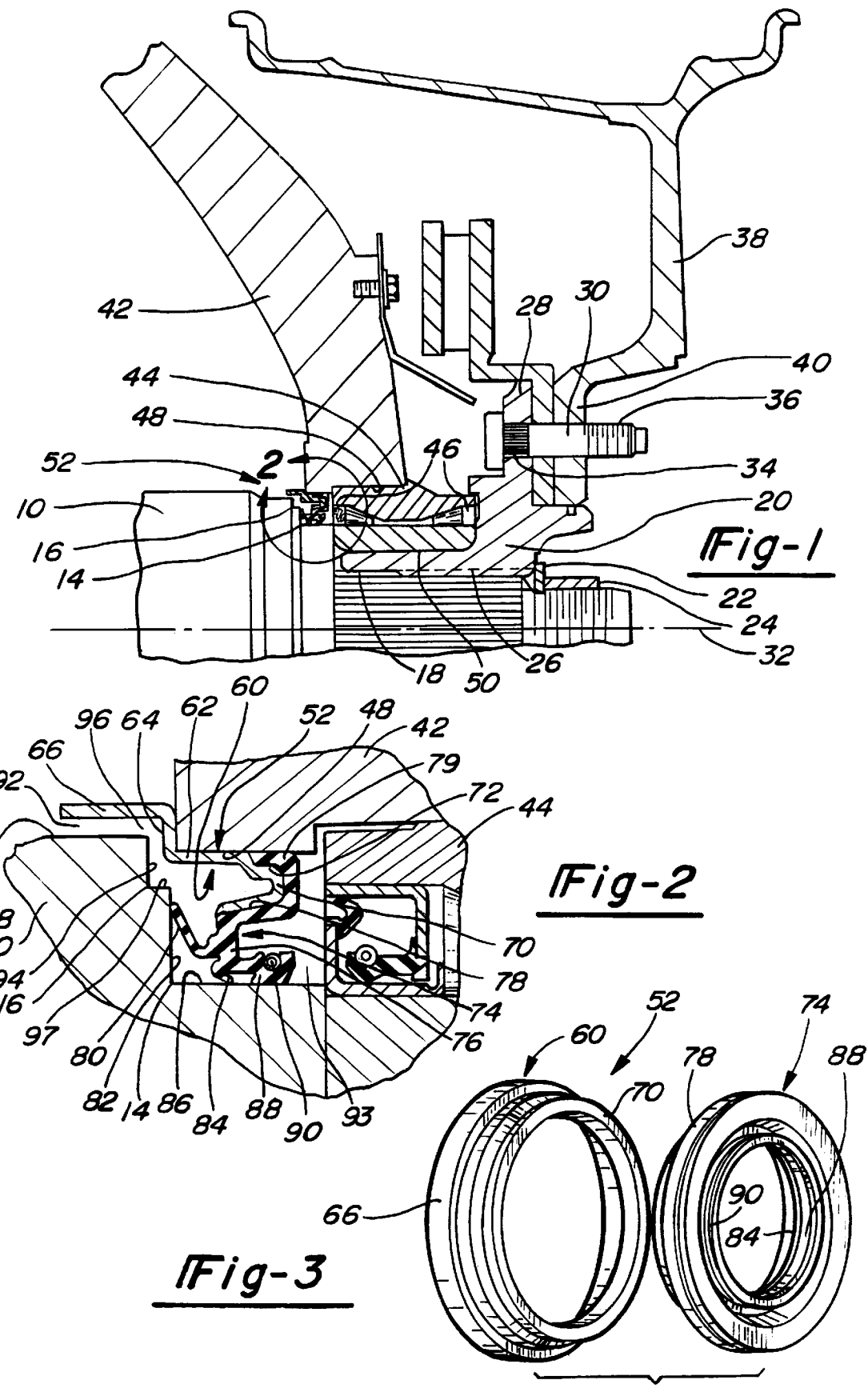

UNITARY AXLE SEAL FOR A MOTOR VEHICLE

BACKGROUND OF THE INVENTION

1. Field of the Invention

This invention pertains to the field of wheel hubs and axles for motor vehicles. More particularly, the invention pertains to axle seals used to reduce the exposure of contaminants to wheel bearing seals and wheel bearings.

2. Description of the Prior Art

Unitized seals, such as those used with a wheel bearing of a motor vehicle, generally include an outer sleeve and an inner sleeve supported for mutual relative rotation. It has been observed that dust or dirt in contact with the unitized seal may cause accelerated wear. The worn unitized seal does not provide a satisfactory hydraulic seal resulting in axle lubricant leakage and contamination from exterior sources which ultimately leads to customer dissatisfaction.

One attempted solution has been to provide an additional seal to reduce the flow of such contaminants toward the unitized bearing seal. Various designs have been suggested, however none have satisfactorily eliminated or substantially reduced the flow of contaminants toward the unitized bearing seal and wheel bearing. These axle seals employ two separate pieces, utilizing an elastic seal and a rigid sleeve adapted to receive the elastic seal. The elastic seal statically engages the axle, and frictionally rotates within the rigid sleeve, which is installed in a wheel support member, such as a steering knuckle. To prevent damaging the fragile seal during shipment of the axle, it must be separately placed on the axle just prior to installing the axle into the steering knuckle. While this prevents damage to the elastic member during axle shipment, the design is more costly to assemble and since the rigid sleeve must be designed to receive the elastic seal during axle installation, the resulting seal interface allows the passage of contaminants.

It would be desirable to provide an unitary axle seal capable of further reducing the flow of contaminants toward the unitized bearing seal and wheel bearings than heretofore exhibited. Additionally, it would be beneficial to provide a unitary axle seal capable of being installed in a single assembly operation, preferably on a steering knuckle prior to its shipment to a final assembly plant.

SUMMARY OF THE INVENTION

The present invention provides a unitary axle seal for use in an automotive vehicle. The unitary axle seal of the presently preferred embodiment comprises an annular reinforcing member having a knuckle mating portion adapted to engage an internal bore of a knuckle. The reinforcing member also includes a deflector portion extending axially from the knuckle mating portion and a seal retainer portion depending from the knuckle mating portion opposite the deflector portion. The seal retainer portion has an outer diameter smaller than the internal bore of the knuckle.

The unitary axle seal also includes a sealing member having a center portion bonded to the seal retainer portion of the annular reinforcing member. The sealing member also includes a static seal portion bonded to the seal retainer portion, thereby forming a static seal between the seal retainer portion and the knuckle. The sealing member further provides an axial lip extending axially from the center portion, the axial lip being operative to sealingly engage an axle as well as a radial lip extending radially inward to sealingly engage the axle. Additionally sealing is provided by a radial pad axially spaced from the radial lip and extending radially inward to sealingly engage the axle. A garter spring surrounds the radial pad to urge the radial pad against the axle, whereby the unitary axle seal prevents passage of contaminants from an external source to an internal region within the axle assembly.

It is an object of the present invention to provide a unitary axle seal capable of reducing the flow of contaminants from the exterior of the axle assembly towards an interior adjacent to a unitized bearing seal and wheel bearing assembly. Advantages provided by this unitary construction include single step installation of the seal on a wheel support member prior to shipment of the wheel support member to the assembly plant.

BRIEF DESCRIPTION OF THE FIGURES

FIG. 1 is a cross section through an axle spindle, wheel hub and steering knuckle to which the present invention can be applied.

FIG. 2 is a cross section of a portion of FIG. 1 in the vicinity of the inner wheel bearing and unitized bearing seal showing an embodiment of the present invention.

FIG. 3 is an exploded view of a unitary axle seal constructed according to the present invention.

DETAILED DESCRIPTION OF THE PREFERRED EMBODIMENT

Referring first to FIG. 1, the outboard end of a motor vehicle axle 10 includes an axle spindle 12 and a stepped outer surface defining various shoulders including first and second shoulders 14, 16. The axle spindle 12 extends through a hub bore 18 of a wheel hub 20. The end of the hub bore 18 is closed by a washer 22 fixed to the wheel hub 20 by a nut 24. The wheel hub 20 is held against rotation on the axle spindle 12 by a first spline connection 26.

The wheel hub contains a radially directed flange 28, which supports lug bolts 30, spaced angularly about the longitudinal axis 32 of the axle 10. The lug bolts 30 are held against rotation on flange 28 by a spline connection 34 and include a threaded shank 36, which is engaged by a lug nut (not shown.) A wheel 38 includes a flange 40, connected to the wheel hub 20 driveably by engaging lug nut on the threads of lug bolt 30.

The axle 10 and wheel hub 20 are rotatably supported within a wheel support member 42 on an axle bearing pack 44. In the preferred embodiment shown, the wheel support member 42 comprises a steering knuckle for supporting the steerable wheel 38. The axle bearing pack 44 and unitized bearing seals 46 are located between an internal bore 48 of the steering knuckle 42 and an outer surface 50 of the wheel hub 20. A unitary axle seal 52 is located adjacent bearing pack 44 between the internal bore 48 of the steering knuckle 42 and the axle 10.

Referring now to FIGS. 2 and 3, unitary axle seal 52 includes an annular reinforcing member 60 having a knuckle mating portion 62 sized for press-fit retention within the internal bore 48 of the steering knuckle 42. In the preferred embodiment, the knuckle mating portion 62 includes a radial flange 64 that abuts against the knuckle 42 when the unitary axle seal 52 is fully inserted into the knuckle 42. Once installed, an axle 10 may be inserted through the unitary axle seal 52 into the internal bore 48 of the steering knuckle 42.

The reinforcing member 60 also includes a deflector portion 66 extending axially from the radial flange 64 of the knuckle mating portion 62. The deflector portion 66 extends parallel to an exterior surface 68 of the axle 10. It has been observed that a clearance of about 0.5–0.75 millimeters between the deflector portion 66 and the external surface 68 of the axle 10 successfully minimizes the flow of contaminants therethrough.

The reinforcing member 52 also includes a seal retainer portion 70 depending inward from the knuckle mating portion 62 opposite deflector portion 66. The seal retainer portion 70 has an outer diameter 72 smaller than the internal bore 48 of the steering knuckle 42. In the preferred embodiment, the seal retainer portion is formed in a U-shape.

The reinforcing member 52 may be manufactured in a conventional manner, such as by stamping. In the preferred embodiment, the reinforcing member is stamped from SAEJ403 108-1010 steel having a nominal thickness of 0.031 inches and a tolerance of +0.005–0.000 inches.

The unitary axle seal 52 also includes a sealing member 74 including a center portion 76 bonded to an inner surface 78 of the seal retainer portion 70. Several contact surfaces for creating seals are formed integrally in the sealing member 74, which is molded from a resilient elastomeric material, such as Nitrile, ™.

The sealing member 74 includes a static seal portion 79 located between the seal retainer portion 70 and the internal bore 48 of the steering knuckle 42 and extending to the center portion 76. The static seal portion 79 is conformingly bonded to the U-shaped seal retainer portion 70 thereby forming a matching U-shape.

The sealing member 74 also includes a cantilevered axial lip 80 extending axially from the center portion 76 and having a predetermined length sufficient to maintain sealing contact with a first radial surface 82 of the first shoulder 14. The sealing member 74 also includes a cantilevered radial lip 84 extending radially inward to a first axial surface 86 of the first shoulder 14. Radial pad 88, extending radially inward to the first axial surface 86 and being axially spaced from the radial lip 84, provides additional sealing. A garter spring 90 surrounds and applies an inward radially directed force to the radial pad 88 forcing it to contact against the first axial surface 86.

In operation, the angular space within the bearing pack 40 between wheel hub 20 and knuckle 42 contains lubricant, which passes between individual bearings and lubricates the anti-friction surfaces. The purpose of the bearing seals 46 is to prevent the lubricant from escaping from the bearing pack 44. The unitary axle seal 52 reduces contaminants from an exterior source 92 from passing into an interior region 93 adjacent to the bearing seal 46.

The unitary axle seal 52 accomplishes this objective by presenting a tortuous labyrinth 96 resistant to the passage of such contaminants. The labyrinth 96 is formed on one side by the combination of the exterior surface 68, a second radial surface 94 and a second axial surface 97 of the second shoulder 16 and on the other side by the deflector 66, the radial flange 64 and the knuckle mating portion 62.

Any contaminants passing through the labyrinth 96 face three additional elastomeric frictional seals resisting further passage of such contaminants. The resilient property of the elastomeric axial lip 80 continuously urges the axial lip 80 into sealed contact with the first radial surface 82 as the axle 10 rotates and translates within a predetermined range of axial motion. As the axle 10 moves axially towards and away from the center portion 76, the axial lip 80 bends from an axially aligned orientation to a more radially aligned orientation. The radial lip 84 maintains sealed contact with the first axial surface 86 during both rotational and axial axle motion through similar cantilevered action. The radial pad 88 is continuously urged by the garter spring 90 to maintain a sealed contact with the first axial surface 86 during both rotational and axial axle motion.

Various other modifications and permutations of the present invention, no doubt, will occur to those skilled in the art. Therefore, it is the following claims, including all equivalents, which define the scope of the present invention.

What is claimed:

1. A unitary axle seal for use in an axle assembly of a motor vehicle having a knuckle and an axle extending through an internal bore thereof, said axle seal comprising:

an annular reinforcing member having a knuckle mating portion adapted to engage the internal bore of the knuckle;

said reinforcing member having a deflector portion extending axially from said knuckle mating portion;

said reinforcing member having a seal retainer portion depending from said knuckle mating portion opposite said deflector portion, said seal retainer portion having an outer diameter smaller than the internal bore of the knuckle;

a sealing member having a center portion bonded to said seal retainer portion;

said sealing member having a static seal portion bonded to said seal retainer portion thereby forming a static seal between said seal retainer portion and the knuckle;

said sealing member having an axial lip extending axially from said center portion, said axial lip being adapted to sealingly engage the axle;

said sealing member having a radial lip extending radially inward, said radial lip being adapted to sealingly engage the axle;

said sealing member having a radial pad axially spaced from said radial lip and extending radially inward, said radial pad being adapted to sealingly engage said axle; and a garter spring surrounding said radial pad, said garter spring being adapted to urge said radial pad against the axle;

whereby said unitary axle seal prevents passage of contaminants from an external source to an internal region of the axle assembly.

2. A unitary axle seal according to claim 1, wherein said seal retainer portion is U-shaped.

3. A unitary axle seal according to claim 2, wherein said static seal is U-shaped and bonded to said seal retainer portion.

4. A unitary axle seal according to claim 1, wherein said knuckle mating portion includes a radial flange adapted to abut the knuckle upon pressing said unitary axle seal into the internal bore of the knuckle a predetermined depth.

5. A unitary axle seal according to claim 1, wherein said axial lip has a predetermined length sufficient to permit a predetermined range of axial movement of the axle while maintaining sealed engagement.

6. A unitary axle seal for use in an axle assembly of a motor vehicle having a knuckle and an axle extending through an internal bore thereof, said axle seal comprising:

an annular reinforcing member having a knuckle mating portion with an outer diameter adapted to engage the internal bore of the knuckle;

said reinforcing member having a deflector portion extending axially from said knuckle mating portion;

said reinforcing member having a first U-shaped portion depending from said knuckle mating portion opposite said deflector portion, said first U-shaped portion having an outer diameter smaller than the internal bore of the knuckle;

a sealing member having a center portion bonded to said first U-shaped portion;

said sealing member having a second U-shaped portion bonded to said first U-shaped portion being adapted to form a static seal between said first U-shaped portion and the knuckle;

said sealing member having a cantilevered axial lip extending axially from said center portion, said axial lip being adapted to sealingly engage the axle;

said sealing member having a cantilevered radial lip extending radially inward, said radial lip being adapted to sealingly engage the axle;

said sealing member having a radial pad extending radially inward, axially spaced from said radial lip, said radial pad being adapted to sealingly engage the axle;

a garter spring surrounding said radial pad, said garter spring being adapted to urge said radial pad against the axle, whereby said unitary axle seal prevents passage of contaminants from an external source to an internal region of the axle assembly.

7. A unitary axle seal according to claim 6, wherein said knuckle mating portion includes a radial flange adapted to abut the knuckle upon pressing said unitary axle seal into the internal bore of the knuckle a predetermined depth.

8. A unitary axle seal according to claim 6, wherein said axial lip has a predetermined length sufficient to permit a predetermined range of axial movement of the axle while maintaining sealed engagement.

* * * * *